F. GUILLOT.
TROLLEY FROG.
APPLICATION FILED AUG. 3, 1908.
1,022,546.
Patented Apr. 9, 1912.
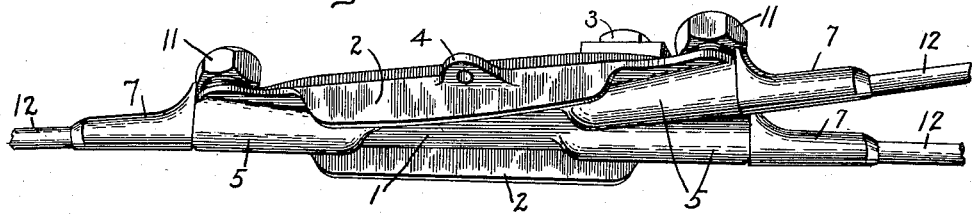
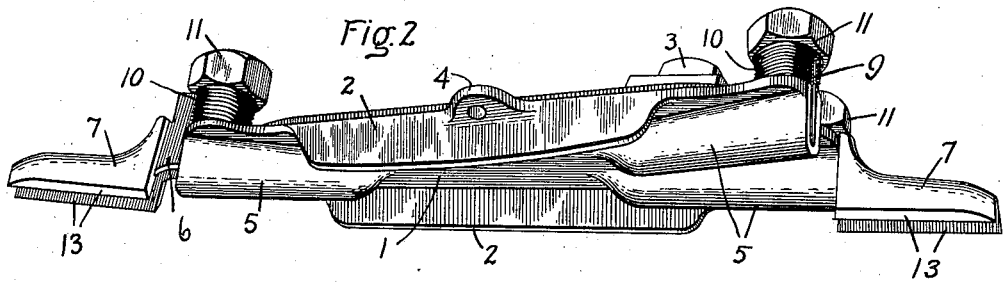
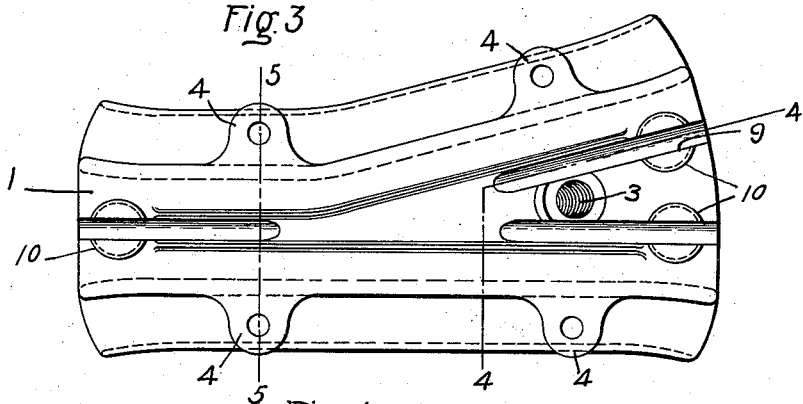
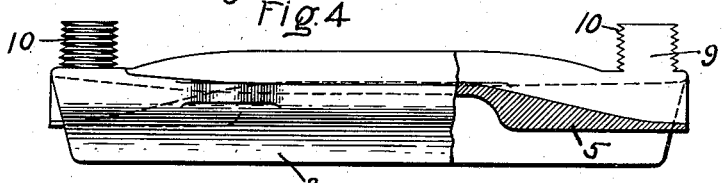
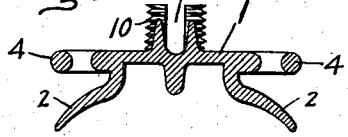
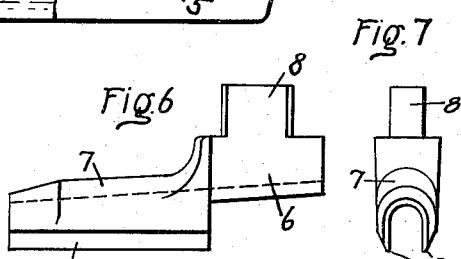
Witnesses:
Lloyd C. Bush
J. Ellis Glen
Inventor:
Frank Guillot,
By ........... Atty.
COLUMBIA PLANOGRAPH CO., WASHINGTON, D. C.

UNITED STATES PATENT OFFICE.

FRANK GUILLOT, OF SCHENECTADY, NEW YORK, ASSIGNOR TO GENERAL ELECTRIC COMPANY, A CORPORATION OF NEW YORK.

TROLLEY-FROG.

1,022,546.  Specification of Letters Patent.  Patented Apr. 9, 1912.

Application filed August 3, 1908. Serial No. 446,514.

*To all whom it may concern:*

Be it known that I, FRANK GUILLOT, a citizen of the United States, residing at Schenectady, county of Schenectady, State of New York, have invented certain new and useful Improvements in Trolley-Frogs, of which the following is a specification.

This invention relates to the overhead structure of electric trolley railways, and its object is to provide an improved frog for connecting the trolley wires at switches and crossovers.

The invention consists in a frog having a body of hard material, such as malleable cast iron, with tongues of a different metal such as an alloy, which may readily be soldered to the trolley wire, said tongues being detachable and interchangeable for all sizes and styles of frogs, and having flanges adapted to be compressed upon the trolley wire and thus perform the function of a clamping shoe. The tongues may be replaced without taking the frog from the line.

In the accompanying drawing, Figure 1 is a perspective view of the underside of a frog embodying my invention; Fig. 2 is a similar view with one tongue omitted and another partly removed; Fig. 3 is a top plan view of a modified construction of frog; Fig. 4 is a side elevation of the same; Fig. 5 is a cross section thereof on the line 5—5, Fig. 3; Fig. 6 is a side elevation of a tongue; and Fig. 7 is an end elevation of the same.

The body 1 of the frog is essentially a flat structure with depending guide flanges 2 along its sides, a tapped hole 3 for a clamping bolt, and lateral ears 4 for guy wires. On its under side the body is provided with three or more longitudinally-disposed ribs 5 preferably one at one end and two at the other. Each rib is hollow and is open at its outer end to admit the shank 6 of a tongue 7, said shank having an upward projection 8 adapted to enter a transverse slot 9 in a stud 10 on the upper side of the body in line with the rib. The stud receives an encircling locking device, preferably a nut 11 screwed down on the stud after the tongue is inserted, which engages the projection 8 and locks the tongue in place. The under side of each tongue is deeply grooved longitudinally to receive the end portion of the trolley wire 12, after which the flanges 13 are clamped upon the wire as shown in Fig. 1.

The body 1 is preferably composed of cast malleable metal, and the tongues of brass or other alloy. Any tongue can be readily removed and replaced without taking down the frog, by simply unscrewing the nut and pulling the tongue out of its socket in the hollow rib.

What I claim as new and desire to secure by Letters Patent of the United States, is,—

1. The combination with a trolley frog body provided with one or more longitudinal hollow ribs at each end, of removable tongues inserted in said ribs, and means for rigidly clamping said tongues thereto.

2. The combination with a trolley frog body provided at each end with one or more longitudinal hollow ribs open at the outer end, of removable tongues having shanks adapted to enter said ribs, and means for rigidly clamping said tongues and the trolley wire to said ribs.

3. The combination with a trolley frog body provided at each end with one or more longitudinal hollow ribs open at the outer end, of removable tongues having shanks adapted to enter said ribs, and means for locking said tongues rigidly in place.

4. The combination with a trolley frog body provided at each end with one or more longitudinal hollow ribs, a stud in line with each rib and provided with a transverse slot, removable tongues each having a shank to enter said rib and an upward projection to enter said slot, and a locking device encircling said stud and projection.

5. The combination with a trolley frog body provided with one or more longitudinal hollow ribs, of a tongue having a shank to enter a rib of said body, and a deep groove in its under side forming flanges adapted to be clamped upon a trolley wire laid in said groove, and a nut on the rib arranged to engage said tongue and grip the wire between said parts.

In witness whereof, I have hereunto set my hand this 31st day of July, 1908.

FRANK GUILLOT.

Witnesses:
  BENJAMIN B. HULL,
  HELEN ORFORD.

Copies of this patent may be obtained for five cents each, by addressing the "Commissioner of Patents, Washington, D. C."